United States Patent
Beinschob

(10) Patent No.: US 11,513,225 B2
(45) Date of Patent: Nov. 29, 2022

(54) POSITION DETERMINATION SYSTEM

(71) Applicant: SICK AG, Waldkirch/Breisgau (DE)

(72) Inventor: Patric Beinschob, Hamburg (DE)

(73) Assignee: SICK AG, Waldkirch/Breisgau (DE)

( * ) Notice: Subject to any disclaimer, the term of this patent is extended or adjusted under 35 U.S.C. 154(b) by 429 days.

(21) Appl. No.: 16/784,795

(22) Filed: Feb. 7, 2020

(65) Prior Publication Data

US 2020/0256996 A1 Aug. 13, 2020

(30) Foreign Application Priority Data

Feb. 11, 2019 (DE) .......................... 102019103344.6

(51) Int. Cl.
| | |
|---|---|
| *G01S 17/42* | (2006.01) |
| *G01S 17/894* | (2020.01) |
| *G01C 21/30* | (2006.01) |
| *G06V 20/56* | (2022.01) |

(52) U.S. Cl.
CPC .............. *G01S 17/42* (2013.01); *G01C 21/30* (2013.01); *G01S 17/894* (2020.01); *G06V 20/56* (2022.01)

(58) Field of Classification Search
USPC ......................................................... 702/152
See application file for complete search history.

(56) References Cited

U.S. PATENT DOCUMENTS

| | | | | |
|---|---|---|---|---|
| 2013/0342391 | A1* | 12/2013 | Hoang | .................. G01S 5/0263 342/357.3 |
| 2016/0070265 | A1* | 3/2016 | Liu | ........................ G05D 1/102 701/25 |
| 2019/0227545 | A1* | 7/2019 | Yoo | ..................... G01C 21/3602 |

(Continued)

FOREIGN PATENT DOCUMENTS

| | | |
|---|---|---|
| DE | 102017005020 A1 | 12/2017 |
| WO | 99/39303 A1 | 8/1999 |

OTHER PUBLICATIONS

Cappellini, et al., "Image Data Compression by the Discrete Cosine Transform", Mathematics and Computers in Simulation, vol. 27, pp. 599-608, 1985.

(Continued)

*Primary Examiner* — Paul D Lee
(74) *Attorney, Agent, or Firm* — Nath, Goldberg & Meyer; Jerald L. Meyer

(57) ABSTRACT

A position determination system for determining a position of a device movable in an environment comprises a position determination unit and a memory unit. An environmental map of the environment is stored in the memory unit. The position determination unit is configured to receive measured distance values of an environmental sensor of the movable device and to determine the position of the movable device by a comparison of the measured distance values with the environmental map. The stored environmental map comprises at least one block, with the block comprising an arrangement of map values representing the environment and with the map values representing distance values from a margin of the environment. The block of the environmental map is stored in the memory unit as a coefficient of a linear combination of basis functions, with the linear combination of the basis functions approximating the map values of the block.

15 Claims, 3 Drawing Sheets

(56) References Cited

U.S. PATENT DOCUMENTS

Figure 1:
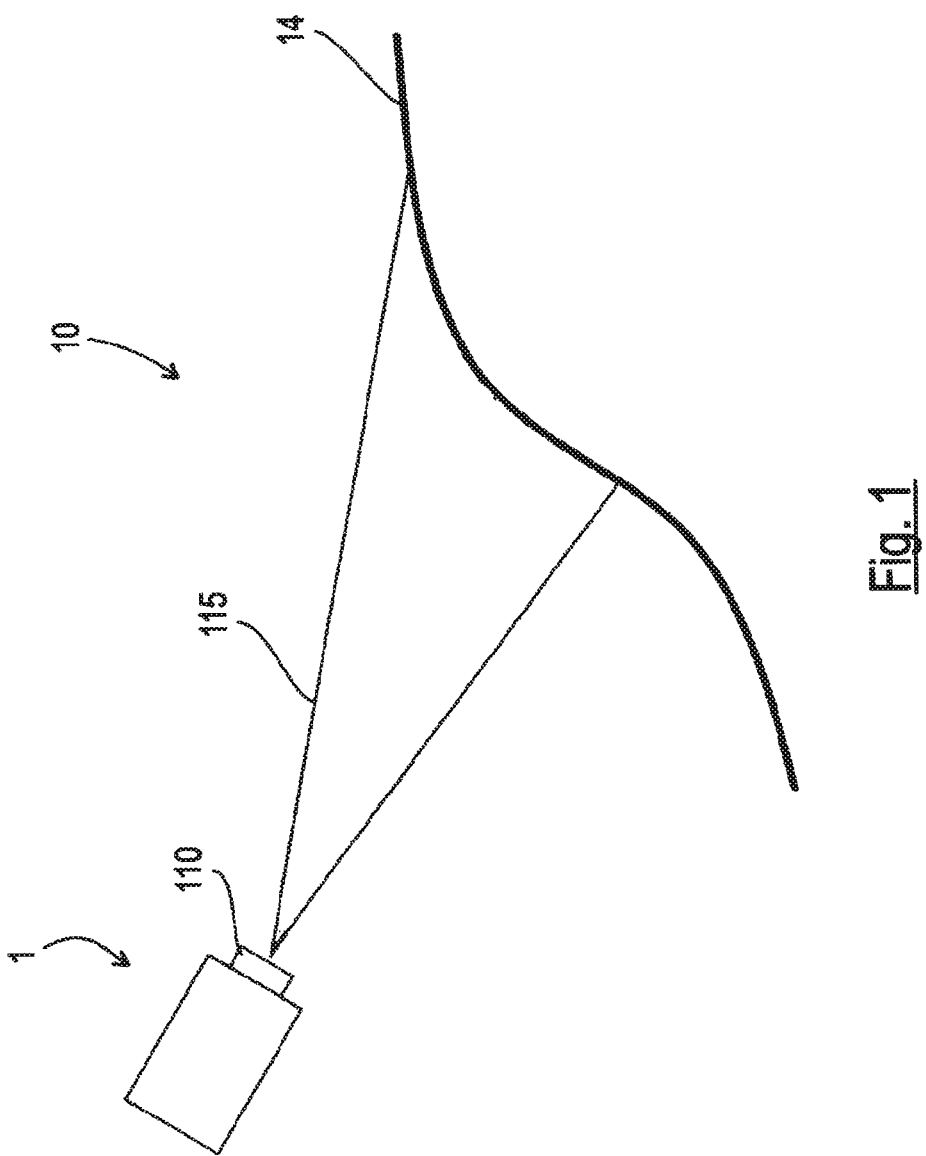

2020/0041285 A1* 2/2020 Kato .................. G09B 29/003

OTHER PUBLICATIONS

Oleynikova, et al., "Signed Distance Fields: A Natural Representation for Both Mapping and Planning", RSS 2016 Workshop: Geometry and Beyond—Representations, 2016.
European Search Report dated Jul. 10, 2020 issued in corresponding European Application No. 20153392.4.
Matthew Klingensmith, Ivan Dryanovski, Siddhartha S. Srinivasa, Jizhong Xiao: "Chisel: Real Time Large Scale 3D Reconstruction Onboard a Mobile Device using Spatially-Hashed Signed Distance Fields", in: Robotics: Science and Systems 2015, DOI: 10.15607/RSS.2015.XI.040, Corpus ID: 1709561.
Matthias Nießner, Michael Zollhöfer, Shahram Izadi, Marc Stamminger: "Real-time 3D Reconstruction at Scale using Voxel Hashing", ACM Trans.Graph. 32, 6. Article 169, Nov. 2013.
Notice dated May 29, 2019 issued in corresponding German Application No. 10 2019103 344.6.

* cited by examiner

POSITION DETERMINATION SYSTEM

The present invention relates to a position determination system for determining a position of a device movable in an environment, to an environmental sensor system for a device movable in an environment, and to a movable device having an environmental sensor system.

A device movable in an environment can, for example, be a vehicle or an airplane. Position determination systems for determining a position of such a device are as a rule configured to determine the position of the device by a comparison of measured values of an environmental sensor of the device with an environmental map. Such position determination systems are as a rule used to control the movable device through the environment in an automated manner and to carry out a position or location regulation using the determined position of the device. In this respect, the accuracy and speed with which the position of the device can be determined decisively determine the accuracies and speeds that can be achieved in the control of the device. To enable a fast and safe determination of the position of the device, the environmental map should be stored in a memory efficient manner in a memory unit and should simultaneously be able to be read out of the memory unit with short access times.

If the device is only movable in one level in the environment, if the device is, for example, a vehicle movable in a floor of a building, the position determination can generally take place in two dimensions and on the basis of a two-dimensional environmental map. Such two-dimensional environmental maps can as a rule comprise a grid of map values completely covering the environment, without the need for resources required for storing and reading the map values restricting the speed or accuracy of the position determination.

A movable device, for instance a vehicle, having a two-dimensional position determination system can, however, not easily be used in environments in which a three-dimensional location change of the device is possible. On a three-dimensional location change, a comparison of the measured values acquired after the location change with the only two-dimensional map values no longer delivers plausible results. Three-dimensional location changes in particular take place when driving over a ramp or during pitching or rolling movements of the device, for instance when traveling over irregular ground.

To nevertheless be able to move a vehicle having a two-dimensional position determination system in an automated manner in more than one level, the movements in the individual levels are decoupled as a rule in that the vehicle is moved between the levels, for instance in an elevator, without determining the position. The maps of the individual levels used for the position determination can then be swapped during the transition from one level to the other. However, in comparison with a ramp, an elevator only makes possible a smaller throughput of vehicles. Pitching or rolling movements of a vehicle having a two-dimensional position determination system as a rule have the result that an emergency stop of the vehicle is carried out on the basis of the non-determinable location of the vehicle and the operation of the vehicle is only restarted when the movements have abated and the vehicle has again adopted a neutral location with respect to the movement level. Such an emergency stop slows the vehicle and results in unwanted wear to the vehicle and to the driving surface.

There is therefore a need also to equip devices only movable in one level with a three-dimensional position determination system. A storage of three-dimensional map values is, however, often not possible due to the resources required for this purpose.

It is the object of the invention to provide a position determination system for a movable device, an environmental sensor system for a movable device, and a movable device such that a position of the device can be determined as fast and as exactly as possible.

This object is satisfied by a position determination system, by an environmental sensor system, and by a movable device in accordance with the independent claims. Further developments are respectively specified in the dependent claims.

A position determination system for determining a position of a device movable in an environment comprises a position determination unit and a memory unit. An environmental map of the environment is stored in the memory unit. The position determination unit is configured to receive measured distance values of an environmental sensor of the movable device and to determine the position of the movable device by a comparison of the measured distance values with the environmental map. The stored environmental map comprises at least one block, with the block comprising an arrangement of map values representing the environment and with the map values representing distance values from a margin of the environment. The block of the environmental map is stored in the memory unit as a coefficient of a combination, for example of a linear combination, of basis functions, with the combination/linear combination of the basis functions approximating the map values of the block.

It has been recognized within the framework of the invention that the environmental map can be stored in a memory efficient manner in the memory unit if distances values from the margin of the environment are stored as map values and if the map values are simultaneously stored by means of the coefficients of the linear combination approximating the map values. Considerably fewer coefficients are namely required as a rule to approximate the map values than map values are present in the block.

To prepare the environmental map, the environment can be divided into spatial elements, in particular into a regular arrangement of spatial elements, and the block can represent such a spatial element. With a two-dimensional environmental map, the spatial elements can be surface elements, for example rectangular, in particular quadratic, surface elements, and with a three-dimensional environmental map, the spatial elements can correspond to volume elements, for example parallelepiped, in particular cuboid, volume elements. The map values representing the environment can be arranged in the block, in particular regularly, for instance on a grid, and can represent spatial points of the spatial elements of the environment arranged regularly, for instance in grid form.

The map values can in particular be stored as functional values of a signed distance function (SDF). In this respect, the individual map values respectively indicate the shortest distance of the point in space respectively represented by the map values from the margin of the environment (e.g. of a wall). The map values here have different signs depending on whether the points in space represented by the map values are arranged inside or outside the environment. The margin of the environment can comprise one or more marginal sections closed in themselves. For example, such a marginal section can be predefined by an outer boundary of the environment and a further such marginal section can comprise a cutout of the environment arranged within the boundary, for instance a cutout arranged around a column or a rack of a shop floor.

If the movable device is formed as a vehicle, the environment can be formed by a travel zone of the vehicle or can comprise a travel zone of the vehicle. The travel zone can, for example, be a hall, in particular a shop floor or a warehouse. The vehicle can be configured to move three-dimensionally in the environment. The environment can in particular comprise a inclined section, for instance a ramp, that can be traveled by the vehicle. The environment can also comprise a plurality of levels that are arranged above one another and that can be traveled by the vehicle.

In addition to the block, the environmental map can comprise further such blocks. The blocks can be arranged next to one another and can fill up the environment. The blocks can in particular be arranged regularly next to one another and can each comprise an arrangement, in particular a regular arrangement; of map values of the spatial elements of the environment respectively represented by the blocks. The map values of all the blocks of the environmental map can here be stored in the memory unit. The map values of the individual blocks are then each stored in that respective coefficients of that linear combination of the basis functions that approximates the map values of the respective blocks are stored for the individual blocks.

The map values approximated by the linear combination of the basis functions of the block form a multi-dimensional field of map values; they can in particular form a two-dimensional or three-dimensional field of map values. The basis functions can, for example; be multi-dimensional, in particular two-dimensional or three-dimensional, polynomials; basis functions of a multi-dimensional, in particular two-dimensional or three-dimensional, discrete cosine transformation (DOT); or basis functions of another suitable multi-dimensional; in particular two-dimensional or three-dimensional, transformation.

The linear combinations with which the map values of the individual blocks are approximated can each include a plurality of basis functions that correspond to a total number of the map values of the individual blocks. The individual blocks can comprise map values arranged in grid form, for example, with a three-dimensional environmental map, with the blocks each comprising 16 map values in all three spatial directions. The individual blocks then each contain $16^3$ map values in total. The map values of the individual blocks can then be approximated by linear combinations of $16^3$ basis functions so that at most $16^3$ coefficients of the linear combination are to be stored in the memory unit for every block. The memory space required to store the blocks of the environmental map can, however, also be reduced in that not all the coefficients of the individual linear combinations are stored, but only those coefficients whose amplitude values or energy values respectively exceed a predefined threshold value. Such coefficients can also be called dominant coefficients of the linear combination. A respective maximum of only 3, 9, or 27 coefficients can in particular be stored per block.

The environmental sensor can be formed as a distance sensor (e.g. a laser scanner) and can detect the distance values by means of the time of flight principle, for example. The environmental sensor can, for example, transmit electromagnetic radiation or ultrasound for the detection of the distance values. The environmental sensor can also be configured as a camera, in particular as a TOF (time of flight) camera.

The position determination unit can be configured also to determine an orientation of the movable device in space, that is a location of the movable device overall, in addition to the position of the movable device, by the comparison of the measured distance values with the environmental map. The position determination unit can be adapted to compare the measured distance values with the environmental map by means of a so-called particle filter (a sequential Monte-Carlo filter, SMC filter) to determine the position or the location of the movable device. In this respect, hypothetical measured values are predicted from hypothetical locations of the device by means of the stored map values of the environmental map and the hypothetical measured values are compared with the measured distance values of the environmental sensor. The position of the movable device is subsequently determined from that hypothetical location whose hypothetical measured values best coincide with the actually determined measured distance values. Such a localization of the movable device can also be called Monte-Carlo localization (MCL).

The position determination unit can be configured as a logical unit, for instance as a microcontroller, an FPGA, or an ASIC, and the memory unit can be configured as a memory module linked to the logical unit or integrated in the logical unit, The position determination unit can in particular comprise a control program in which logical instructions for determining the position of the movable device are stored.

In a further development of the position determination system, the environmental map comprises a plurality of blocks that are arranged next to one another and that fill up the environment, with only blocks through which the margin of the environment run being stored in the memory unit. Since only blocks arranged around the margin of the environment, but not blocks arranged in the total environment, are stored in the memory unit, the memory requirement needed to store the environmental map is reduced and the position of the movable device can be determined particularly fast and safely.

The blocks can be stored in the memory unit in an addressable manner by means of a hash function. The hash function here maps the spatial coordinates of the blocks to memory addresses of the memory unit. If the blocks represent volume elements of a three-dimensional environment, the storing of the blocks in the memory unit by means of the hash function can also be described as so-called Voxel hashing.

In a further development of the position determination system, an extent of the block is at least twice as large and at most ten times as large, in particular at most or exactly five times as large, as a scatter of the measured distance values of the environmental sensor. It can thereby in particular be ensured when only the blocks surrounding the margin of the environment are stored in the memory unit that the extent of the blocks is large enough to also enable a reliable determination of the position of the movable device with scattered measured distance values. The measured distance values can, for example, scatter around the actual distance value due to electronic noise or also due to changing environmental conditions.

In a further development of the position determination system, the basis functions are formed by basis functions of a discrete cosine transformation. If cosine functions are used as basis functions, the coefficients of the linear combination used to approximate the map values can be particularly easily compressed. It can additionally be ensured that the linear combinations of the basis functions of the individual blocks are each constant in the borders between the blocks.

In a further development of the position determination system, the coefficients of the linear combination are only stored in the memory unit if their amounts exceed predefined threshold values. The coefficients of the linear combinations can thereby be stored in a particularly memory efficient and quickly readable manner in the memory unit and the position of the movable device can be determined particularly fast and safely. The threshold values can in particular be predefined as part of a so-called quantization encoding. Uniform threshold values can be predefined for all the coefficients. However, respective different, individual threshold values can also be predefined for the individual coefficients.

If a block of the environmental map comprises $16^3$ map values, the spatial directions of a respective only 3 coefficients can exceed the predefined threshold values. In this case, only nine coefficients are stored for the block in the memory unit instead of $16^3$ coefficients.

In a further development of the position determination system, the threshold values for the individual coefficients are individually predefined. It can thereby be ensured that only those coefficients are stored in the memory unit whose associated basis functions are typically required to approximate the map values. If spatial frequencies are associated with the individual coefficients of the linear combination, the threshold values for the individual coefficients can be predefined such that only coefficients are stores whose frequencies are required to approximate the map values.

In a further development of the position determination system, the coefficients are stored in compressed form in the memory unit. The memory space required for the storage of the coefficients is thereby particularly small and the position of the movable device can be determined fast and safely. These coefficients can in particular be stored in a lossless compressed manner, for example by means of run length encoding and/or Huffman encoding.

A further development of the position determination unit is configured to determine the position of the movable device on the basis of a gradient of the linear combination of the basis function. The basis functions are configured here such that the linear combinations formed from the basis functions are constant at a border between the block and an adjacent block.

The position of the movable element can be determined, for example as part of a Monte-Carlo localization, as that position at which is most likely that the surroundings sensor generates values that are identical to the measured distance values. This most likely position can be determined from the set of all hypothetical positions of the movable device using the gradient determined from the linear combination of basis functions, for example by means of the so-called gradient process (method of the steepest descent). The gradient of the linear combination can also be used to reconstruct the environment or environmental elements of the environment, for instance the margin of the environment, from the linear combination of the basis functions. The hypothetical measured values can, for example, be determined by means of the reconstructed environmental elements as part of a Monte-Carlo localization.

A further development of the position determination unit is configured to determine the position, in particular a location, of the movable device in a three-dimensional coordinate system of the environment, with the block representing a volume element of the environment with a three-dimensional arrangement of the map values. The location of the movable device can in particular be determined in six degrees of freedom, with three degrees of freedom defining the position and three further degrees of freedom defining the orientation of the movable device.

An environmental sensor system is furthermore provided for a device movable in an environment and having an environmental sensor and a position determination system for determining a position of the movable device from measured distance values of the environmental sensor. The environmental sensor system can in particular comprise the position determination system in accordance with the invention. To this extent all the further developments and advantages that are described in connection with the position determination system in accordance with the invention also relate to the environmental sensor system.

In a further development of the environmental sensor system, the position determination system is integrated in a housing of the environmental sensor. The position determination system is configured to output the position of the movable device as an output value of the environmental sensor system. The position determination system can thereby be implemented particularly simply and in a particularly space saving manner. The position determination system can in particular be implemented in a logical unit of the environmental sensor. The position determination system can be configured as an embedded system in the environmental sensor.

In addition, a movable device, in particular an automated guided vehicle, having an environmental sensor system in accordance with the invention is provided.

Figure 2:
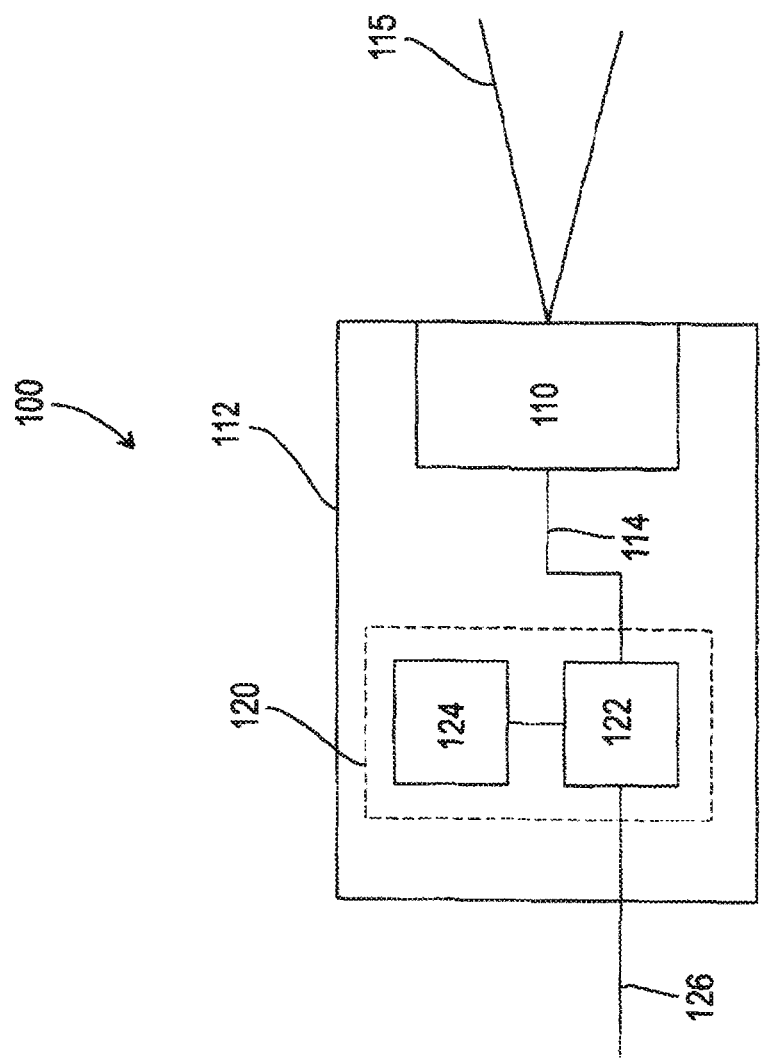

The invention will be explained in the following with reference to Figures. There are shown in a schematic representation in each case:

FIG. 1 a device movable in an environment;

FIG. 2 an environmental sensor system of the movable device; and

Figure 3:
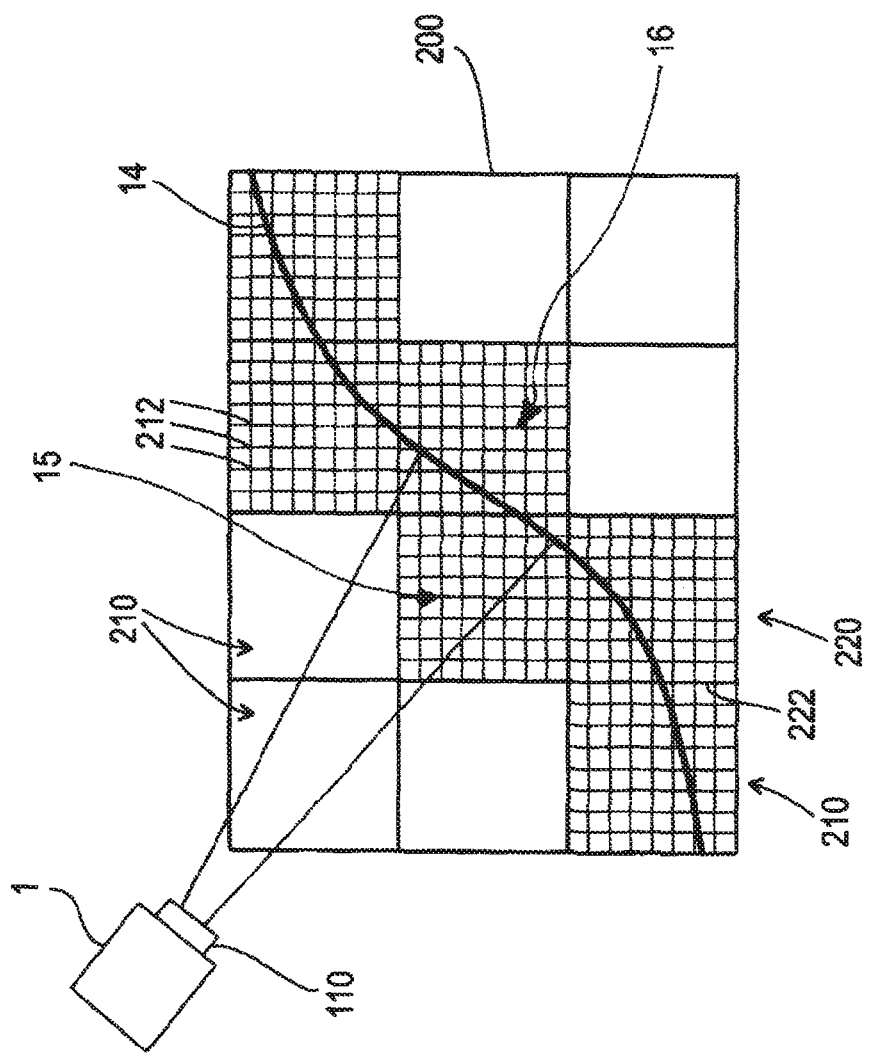

FIG. 3 a map of the environment.

FIG. 1 shows a device 1 movable in an environment 10. The movable device 1 is configured as an automated guided vehicle and comprises an environmental sensor 110. The environmental sensor 110 is configured as a laser scanner working in accordance with the time of flight principle and is arranged at a front side of the movable device 1 in a direction of travel.

The environmental sensor 110 is configured to scan a margin 14 of the environment 10 and to produce measured distance values that represent a distance between the movable device 1 and the margin 14 of the environment 10. The environmental sensor 110 is configured to scan the margin 14 of the environment 10 in a detection zone 115 of the environmental sensor 110. The detection zone 115 can, for example, be arranged in a level and can be oriented in parallel with a movement level or travel level of the movable device 1.

An environmental sensor system 100 of the movable device 1 is shown in FIG. 2. The environmental sensor system 100 comprises the environmental sensor 110 and a position determination system 120. The position determination system 120 comprises a position determination unit 122 and a memory unit 124 connected to the position determination unit 122 via a data line. The position determination unit 122 is connected to the environmental sensor 110 via a data line to receive the measured distance values 114 produced by the environmental sensor 110. The environmental sensor 110 and the position determination system 120 are arranged in a common housing 112 of the environmental sensor 110. The position determination system 120 is here implemented in a logical unit of the environmental sensor system 100.

An environmental map 200 shown in FIG. 3 is stored in the memory unit 124 and the position determination unit 122 is adapted to compare the measured distance values 114 of the environmental sensor 110 with the environmental map 200 and to determine a position of the movable device 1 from the comparison. The position determination system 120 is further configured to output the position of the movable device 1 as an output value 126 of the environmental sensor system 100. The output value 126 representing the position of the movable device 1 is transmitted to a control of the movable device 1 and the control is configured to control, in particular to regulate, the position of the movable device 1 by means of the output value 126.

As is shown in FIG. 3, the environmental map 200 comprises a plurality of (virtual) blocks 210 arranged regularly next to one another. The blocks 210 fill up the environment 10, with only a portion of the environmental map 200 comprising a total of twelve of the blocks 210 being shown in FIG. 3. The blocks 210 each comprise a regular arrangement of map values 212. Only the map values 212 of the blocks 210 stored in the memory unit 124 are shown in FIG. 3. As is shown in FIG. 3, only those blocks 210 through which the margin 14 of the environment 10 runs are stored in the memory unit 124 of the position determination system 120.

Each of the map values 212 forms a functional value of a signed distance function of the environment 10, with the distance function adopting positive functional values in an interior 15 of the environment 10 and adopting negative functional values in an exterior 16 of the environment 10. The individual blocks 210 are stored in the memory unit 124 in that the memory unit 124 respectively comprises coefficients of linear combinations of basis functions for the individual blocks 210, with the linear combinations respectively formed from the coefficients of the individual blocks 210 each approximating the map values 212 of the respective blocks 210. The basis functions in the example explained here are each basis functions of a multi-dimensional, in particular of a two-dimensional, discrete cosine transformation. The linear combinations of the basis functions formed from the stored coefficients are each constant at borders 222 between the blocks 210, in particular at a border 222 between one of the blocks 210 and an adjacent block 220.

In alternative embodiments of the position determination system 120, the blocks 210 can each represent three-dimensional volume elements of the environment 10 and the environmental map 200 can also comprise a three-dimensional arrangement of the blocks 210 in a manner analog to FIG. 3. The environmental map 200 can, for example, comprise respective further levels having map values 212 arranged regularly in a three-dimensional grid above and below the plane of the drawing shown in FIG. 3. The blocks 210 of such an environmental map 200 can be stored as coefficients of a linear combination of three-dimensional basis functions. The three-dimensional basis functions can, for example, be basis functions of a three-dimensional discrete cosine transformation.

The coefficients of the individual blocks 210 are each stored at separate memory spaces of the memory unit 124, with addresses of the memory spaces of the individual blocks each being predefined by a hash function. The hash function forms spatial coordinates of the individual blocks 210 in each case on the memory spaces associated with the respective blocks 210.

REFERENCE NUMERAL LIST 1 movable device
10 environment
12 environmental element
14 margin
15 interior
16 exterior
100 environmental sensor system
110 environmental sensor
112 housing
114 measured distance values
115 detection zone
120 position determination system
122 position determination unit
124 memory unit
126 output value
200 environmental map
210 block
212 map values
216 threshold values
220 adjacent block
222 border

The invention claimed is:

1. A position determination system for determining a position of a device movable in an environment, the position determination system having a position determination unit and a memory unit,
   wherein an environmental map of the environment is stored in the memory unit;
   wherein the position determination unit is configured to receive measured distance values of an environmental sensor of the movable device and to determine the position of the movable device by a comparison of the measured distance values with the environmental map;
   wherein the stored environmental map comprises at least one block;
   wherein the block comprises an arrangement of map values representing the environment;
   wherein the map values represent distance values from a margin of the environment; and
   wherein the block of the environmental map is stored in the memory unit as a coefficient of a linear combination of basis functions, with the linear combination of the basis functions approximating the map values of the block.

2. The position determination system in accordance with claim 1,
   wherein the environmental map comprises a plurality of blocks arranged next to one another and filling up the environment; and
   wherein only blocks through which the margin of the environment runs are stored in the memory unit.

3. The position determination system in accordance with claim 1,
   wherein an extent of the block is at least twice as large, and at most ten times as large as a scatter of the measured distance values of the environmental sensor.

4. The position determination system in accordance with claim 3,
   wherein an extent of the block is five times as large as a scatter of the measured distance values of the environmental sensor.

5. The position determination system in accordance with claim 1,
   wherein the basis functions are formed by basis functions of a discrete cosine transformation.

6. The position determination system in accordance with claim 1,
wherein the coefficients of the linear combination are only stored in the memory unit when their amounts exceed predefined threshold values.

7. The position determination system in accordance with claim 6,
wherein the threshold values for the individual coefficients are individually predefined.

8. The position determination system in accordance with claim 1,
wherein the coefficients are stored in compressed form in the memory unit.

9. The position determination system in accordance with claim 1,
wherein the position determination unit is configured to determine the position of the movable device on the basis of a gradient of the linear combination of the basis functions; and
wherein the basis functions are configured such that the linear combinations formed from the basis functions are constant at a border between the block and an adjacent block.

10. The position determination system in accordance with claim 1,
wherein the position determination unit is configured to determine the position of the movable device in a three-dimensional coordinate system of the environment; and
wherein the block represents a volume element of the environment with a three-dimensional arrangement of the map values.

11. The position determination system in accordance with claim 10,
wherein the position determination unit is configured to determine a location of the movable device in a three-dimensional coordinate system of the environment.

12. An environmental sensor system for a device movable in an environment, the environmental sensor system comprising an environmental sensor and a position determination system for determining a position of the movable device from measured distance values of the environmental, the position determination system having a position determination unit and a memory unit,
wherein an environmental map of the environment is stored in the memory unit;
wherein the position determination unit is configured to receive measured distance values of an environmental sensor of the movable device and to determine the position of the movable device by a comparison of the measured distance values with the environmental map;
wherein the stored environmental map comprises at least one block;
wherein the block comprises an arrangement of map values representing the environment;
wherein the map values represent distance values from a margin of the environment; and
wherein the block of the environmental map is stored in the memory unit as a coefficient of a linear combination of basis functions, with the linear combination of the basis functions approximating the map values of the block.

13. The environmental sensor system in accordance with claim 12,
wherein the position determination system is integrated in a housing of the environmental sensor,
wherein the position determination system is configured to output the position of the movable device as an output value of the environmental sensor system.

14. A movable device having an environmental sensor system, the environmental sensor system comprising an environmental sensor and a position determination system for determining a position of the movable device from measured distance values of the environmental, the position determination system having a position determination unit and a memory unit,
wherein an environmental map of the environment is stored in the memory unit;
wherein the position determination unit is configured to receive measured distance values of an environmental sensor of the movable device and to determine the position of the movable device by a comparison of the measured distance values with the environmental map;
wherein the stored environmental map comprises at least one block;
wherein the block comprises an arrangement of map values representing the environment;
wherein the map values represent distance values from a margin of the environment; and
wherein the block of the environmental map is stored in the memory unit as a coefficient of a linear combination of basis functions, with the linear combination of the basis functions approximating the map values of the block.

15. The movable device in accordance with claim 14 that is an automated guided vehicle.

* * * * *